US010408034B2

(12) United States Patent
Beauquin et al.

(10) Patent No.: US 10,408,034 B2
(45) Date of Patent: Sep. 10, 2019

(54) SYSTEM AND METHOD FOR EXTRACTING GAS FROM A WELL

(71) Applicant: TOTAL SA, Courbevoie (FR)

(72) Inventors: Jean-Louis Beauquin, Saint-faust (FR); Guillaume Maj, La Tronche (FR); Jacques Danquigny, Idron (FR); Matthieu Deleersnyder, Pau (FR)

(73) Assignee: TOTAL SA, Courbevoie (FR)

( * ) Notice: Subject to any disclaimer, the term of this patent is extended or adjusted under 35 U.S.C. 154(b) by 172 days.

(21) Appl. No.: 15/507,643

(22) PCT Filed: Aug. 28, 2014

(86) PCT No.: PCT/FR2014/052140
§ 371 (c)(1),
(2) Date: Feb. 28, 2017

(87) PCT Pub. No.: WO2016/030585
PCT Pub. Date: Mar. 3, 2016

(65) Prior Publication Data
US 2017/0292361 A1    Oct. 12, 2017

(51) Int. Cl.
*E21B 43/38* (2006.01)
*E21B 43/12* (2006.01)
*F03B 13/02* (2006.01)

(52) U.S. Cl.
CPC ............ *E21B 43/38* (2013.01); *E21B 43/121* (2013.01); *E21B 43/122* (2013.01);
(Continued)

(58) Field of Classification Search
CPC ...... E21B 43/38; E21B 43/122; E21B 43/121; E21B 43/385; E21B 43/129; F03B 13/02; Y02E 10/28; Y02P 70/527
See application file for complete search history.

(56) References Cited

U.S. PATENT DOCUMENTS 2,311,963 A * 2/1943 Pyle .................. E21B 43/38
166/105.5
6,070,661 A  6/2000 Kennedy et al.
(Continued)

FOREIGN PATENT DOCUMENTS

EP         0 811 749 A1   12/1997
WO    WO 2009/097869 A1   8/2009

OTHER PUBLICATIONS

International Search Report PCT/FR2014/052140, dated May 6, 2015, 4 pages.
(Continued)

*Primary Examiner* — Brad Harcourt
(74) *Attorney, Agent, or Firm* — Patterson Thuente Pedersen, P.A.

(57) ABSTRACT

The present invention concerns a system for extracting the liquids from a well producing liquid and gas. The system comprises a separation wall defining, in the well, a first space and a second space; a liquid-gas separator; and a system for eliminating separated liquid. The first space is suitable for conveying a mixture comprising the gas and liquid from a production area to the separator. The separator is suitable for separating the gas and liquid from the mixture. The second space receives the liquid separated from the mixture. Finally, the elimination system is suitable for eliminating the separated liquid using at least the gravitational potential energy of said separated liquid in the second space.

17 Claims, 5 Drawing Sheets

(52) U.S. Cl.
CPC .......... *E21B 43/129* (2013.01); *E21B 43/385* (2013.01); *F03B 13/02* (2013.01); *Y02E 10/28* (2013.01); *Y02P 70/527* (2015.11)

(56) References Cited

U.S. PATENT DOCUMENTS 7,204,314 B2     4/2007   Lauritzen et al.
2004/0144545 A1   7/2004   Lauritzen et al.

OTHER PUBLICATIONS

English translation of International Search Report PCT/FR2014/052140, dated May 6, 2015, 2 pages.

\* cited by examiner

SYSTEM AND METHOD FOR EXTRACTING GAS FROM A WELL

RELATED APPLICATIONS

The present application is a National Phase entry of PCT Application No. PCT/FR2014/052140, filed Aug. 28, 2014, said application being hereby incorporated by reference herein in its entirety.

FIELD OF THE INVENTION

This invention relates to the field of eliminating liquids at the bottom of a well and in particular in the framework of a gas extraction well.

BACKGROUND OF THE INVENTION

During the production of natural gas by the deposits, a "coproduction" of water or of liquid hydrocarbons can also occur. At the beginning of the operation of the deposit, the flow rate of gas produced is generally high enough to naturally drive these liquids to the surface under the effect of the induced aerodynamic efforts.

When production decreases, the drop in the speed of the flow of the gas results in an increase in the pressure at the bottom of the well due to the increasing influence of the liquids that "bear down" increasingly on the column of gas. The presence of liquids, even if they are still driven by the gas, then substantially penalises the productivity of the gas extraction well.

Moreover, as soon as the flow rate of the gas produced decreases below a limit value, the liquids can no longer be driven by the gas. The liquids then accumulate at the bottom of the well, which leads almost irremediably to the stopping of production if an artificial lift is not implemented.

Diagrammatically, it can therefore be considered that during the operation of the deposit, the arrival of liquids at the bottom of the well, has for effect:
in a first step, to limit the flow rate of gas produced by the well,
in time, to limit the rate of recovery of the reserve of gas underground.

A temporary solution can be to install velocity strings in order to accelerate the production speed of the gas and as such favour the extraction of the liquid from the well. These velocity strings most often include a decrease in the diameter of the extraction tubes. However, these velocity strings limit the instantaneous production capacity of the well and are only a temporary solution.

When the flow rate of gas produced by a well no longer makes it possible to drive the liquids to the surface (with or without velocity strings), the methods generally considered in order to resume production consist in implementing an artificial lift technique.

These artificial lifts require, most often, a continuous supply of energy:
either at the bottom of the well:
pneumatic energy (techniques referred to as "Gas-Lift"), possibly supplemented by an injection of chemicals for the production of foam or emulsion (techniques referred to as "Foam-Lift"),
electrical energy (e.g. immersed electric pump),
hydraulic energy (e.g. hydraulic pumps, liquid-liquid ejector)
or on the surface:
pumps driven by a surface engine (reciprocating pumping: or continuous pumping): these solutions require transferring the mechanical power from the surface to the bottom of the well,
lowering of the pressure of the well head using gas compression units.

However, such artificial lift techniques are not free of defects.

Most often these artificial lift techniques require a subsequent supply of energy which penalises the economic profitability of the well.

In addition, the equipment required for implementing these methods can be cumbersome and can require heavy and complex maintenance.

Regardless of the solution retained, from among those mentioned hereinabove, the energy consumption required is often an obstacle for an implantation on isolated production sites.

There is as such a need to limit the outside supply of energy required to eliminate the liquids present in these wells, and this in a non-temporary way.

Document US 2004/0144545 A1 proposes to use a portion of the energy contained in the circulation of the gas in order to power a liquid pump and to evacuate the liquid present in the well to the surface using this pump. However, this recovery of energy requires the installation of gas turbines within a well: these gas turbines must then rotate quickly in order to supply enough energy. In addition, any impurity contained in the gas (or transported by the gas) can damage this turbine. These substantial rotating speeds decrease the resistance of these turbines and render them fragile and complex. In the event of problems with these gas turbines, any maintenance is then heavy and expensive. This invention improves the situation.

SUMMARY OF THE INVENTION

For this purpose, this invention proposes to improve the elimination of the liquids present at the bottom of the well simply and economically.

This invention thus aims for a system for extracting liquids from a well producing liquid and gas. The system comprises:
a separation wall defining in a portion of said well at least one first space and a second space,
a liquid-gas separator,
a pump,
a hydraulic turbine;
and wherein,
the first space is suitable for conveying a mixture comprising said gas and said liquid from a production area to said separator,
the separator is suitable for separating said gas and said liquid from said mixture during a circulation of said mixture from the first space,
the second space is suitable for receiving the liquid separated from said mixture, the second space comprises a bottom opening in a first bottom area of said well, the bottom opening being suitable for allowing a circulation of the separated liquid from the second space to the first space;
the turbine is suitable for being set into movement, under the effect of a circulation gravitation of the separated liquid;

the pump is able to be driven by the movement of said turbine and is suitable for eliminating a quantity of separated liquid by pumping.

This evacuation makes it possible to increase the production of gas and to delay the stopping of the production of this well by the loss of natural eruption.

The term putting into movement of a turbine means a rotation or a translation according to the type of turbine considered.

Most often the separation wall is substantially parallel to the walls of the well. For example, the wall can be a tube of a certain height placed preferentially at the bottom of the well. As such the first space is, for example, the annular space formed between the walls of the well (for example, the tubing) and this tube. The second space is, in this case, the space defined by the inside of the tube. Of course other arrangements are possible, with the first space conveying the liquid and gas mixture that can be located inside the tube, in this case, the second space receiving the separated liquid is the annular space.

The separation wall can also be a wall introduced into the well and separating the well, over a portion, into two half-columns that may be symmetrical (i.e. the wall then being in this case along a diameter of the well).

The mixture contained in the first space can be variable: it can for example include a high proportion of gas with a few droplets of liquids, but also liquid with a few gas bubbles. This mixture can depend on the well, its condition, or degree of elimination of the liquid by the system.

The separator is most often placed above the production area, and preferentially at the top of the first space, at the level wherein the separation wall introduced ends. The production area is also called "reservoir-wellbore interface", "pay zone", "drainage area" or "bottom (or lower) completion" when this area is specifically provided with tubing and accessories designed according to the nature of the rock-reservoir and of the rheological characteristics of the fluids produced. According to the nature of the rock-reservoir, the "reservoir-wellbore interface" can indeed be carried out be perforating at several locations the wall of the casing, this is then referred to as "perforations" or "perforated zone", it can also be outfitted for example with strainers or a gravel filter calibrated in such a way as to provide sand control for the sand driven when the well produces its effluents. This makes it possible to prevent the deterioration of the tubing, pumps and other installations downstream by abrasion or silting.

The liquid-gas separator can be of different types, for example "static" (or "gravity") "not activated" when this is solely by natural segregation under the action of the difference in weight between the gas and the liquid). It can be "dynamic not activated" when it is due to its drawing and geometric profile of its components by imprinting to the fluid mixture a suitable movement, for example a rotation, it is in this case cyclone or centrifugal separation (e.g.: cyclone, vortex, propeller of the "Auger" type, etc.). It can be "activated" when it receives outside activation energy, for example in the form of an electrostatic field or by a mechanical drive that sets into movement, for example, one of its components, for example a propeller, a blading or one of its walls. This drive system or engine to which it is coupled can be for example of the hydraulic type and driven by the flow of the liquid output or of the gas outlet of said separator. Said engine can be the engine or the turbine that is already driving the liquid pump, but it can also be an engine dedicated solely to the driving of said separator.

The bottom opening is not necessarily carried out at the very bottom of the second space.

The pumping can be carried out in the direction of the surface, but it is also possible to provide a reinjection into a lower reservoir, i.e. into a reservoir of which the back pressure is less than the pressure at the output of the pump.

The bottom opening can allow for a reinjection of the liquid separated in the first space and as such enable a circulation of the liquid in the form of a cycle. This cycle can be carried out (at least partially) substantially vertically, with the separated liquid flowing downward in the second space and flowing upward in the first space under the effect of a driving by the gas.

In the embodiment described hereinabove, the turbine is a hydraulic turbine activated by the liquid (not a gas turbine). Indeed, this type of turbine is more resistant than gas turbines, which are generally subjected to the risks of abrasion by the solids and by the droplets of liquid, due to the substantial speeds required in order to enable significant power production. In particular, a hydraulic turbine can operate under low rotation speeds or low operating speeds (according to whether it is a rotating turbine or a piston hydraulic engine), which limits the risks of mechanical failure.

Many drivings of the pump by the turbine can be considered according to their respective type. The use of rods, gearing or engine drive shafts can be considered.

Furthermore, a flow rate of the quantity of eliminated liquid can be less than a predetermined factor at a flow rate of liquid setting said turbine in movement.

Advantageously, the system can further comprise an injection orifice suitable for allowing an injection of gas into a second bottom area of the first space.

This injection can be carried out possibly at the very bottom of the production area of the well.

This gas can be a gas coming from the surface and injected on purpose. It can also come from another overlying layer of rock or underlying layer where applicable.

The second bottom area can be confounded with the first bottom area. In any case, this injection orifice can allow for an effective injection of gas in the first space so as to overcome the lack of circulation of production gas in this first space. The lower the gas injection orifice is with respect to the wall introduced for the separation of the first and second spaces, the more effective the effectiveness of this injection can be. In turn its pressure has to be higher in order to be able to be injected into said area.

In an embodiment, the system can further comprise an anti-backflow device that allows for the circulation of the mixture (possible solely) from the first space to the second space through the liquid-gas separator.

This anti-backflow device (e.g. a non-return valve) can make it possible to effectively start the device for eliminating if the gravitational potential energy available in the second space is not enough to overcome the forces of static friction of the turbine and of the pump.

Advantageously, the separator can be a centrifugal separator.

For example, the separator can be driven in rotation by the rotation of the turbine.

As such, the separation of the liquid-gas mixture can be substantially improved. An effective separation of the mixture makes it possible to prevent (or at the very least substantially limit) any loss of mechanical energy in the well during the rising of the production gases.

In a particular embodiment, the second space can be located around the first space.

As such, if the separator flushes the liquid at the periphery of the latter (e.g. centrifugal separator), it is simpler to pour the separated liquid into the second space, with the latter being located below this periphery.

Advantageously, the separator is located between the turbine and the pump.

As such, it can be advantageous to place the pump at a high location, for example above the separator in such a way as to simplify the setting in place of the device.

The turbine and the pump can be connected by a rod or a hollow shaft suitable for transmitting a mechanical power from the turbine to the pump and for pumping a liquid from the second space.

As such, this hollow rod or this hollow shaft can make it possible to both transmit a force or a mechanical torque to the pump coming from the turbine and the pump to pump the liquid from a level close to the discharge of the turbine, upstream of its mixture with the production gas.

Furthermore, said separation wall can comprise a secondary tube inserted into a main tube, with the first space comprising a space between the main tube and the secondary tube, with the second space comprising a space in the secondary tube.

Advantageously, the well can be thermally insulated in the portion of the well wherein the first zone and the second zone are defined.

Indeed, this thermal insulation can make it possible to limit the thermal exchanges between the mixture and/or the liquid and the underground. This limitation can make it possible to obtain at the output of the first space a gas of which the temperature (and therefore the absolute vapour saturation) is as low as possible.

Limiting the saturation in liquid of the gas exiting at the top portion of the separator can make it possible to limit a loss of energy due to the condensation of liquid during the rising of the gas in the well.

Furthermore, the thermal exchanges between the well and the outside of the well can be favoured in a portion of the well above the first space and the second space.

As such, the heating of the gas circulating in the well can then be favoured. This heating (enthalpy gain) makes it possible to separate the gas from its dew point, i.e. to limit the condensation of vapour in the upper portion of the well in contact with the colder walls.

A method for extracting liquid from the bottom of a well can be in itself advantageous when it makes it possible to favour the gas production of a well.

As such, this invention also aims for a method for extracting liquids from a well producing liquid and gas method for extracting gas from an extraction well producing gas and liquid, with the well comprising a separation wall defining in a portion of said well a first space and a second space, a hydraulic turbine and a pump, with the second space comprising a bottom opening allowing for a communication between the second space and the first space in a first bottom area of said well.

The method comprises:
conveyance in the first space of a mixture comprising said gas and said liquid from a production area to a liquid-gas separator;
separation of said liquid and of said gas within said liquid-gas separator;
conveyance of said separated gas in the well from the separator to a well output area;
introduction of said separated liquid into the second space;
setting into movement of the turbine under the effect of a gravitation circulation of the separated liquid;
pumping of a quantity of the separated liquid, said pumping being activated by the movement of said turbine.

Advantageously, the method can further comprise:
injection of gas into a second bottom area of the first space.

This injection can be carried out, for example, at the very bottom of the production area of the well.

In a particular embodiment, the second space comprising a bottom opening communicating with a third space suitable for receiving said quantity of separated liquid, with the third space being located under the second space, with the third space being isolated from the first space, the method can further comprise:
conveyance of said quantity of separated liquid in the third space through the bottom opening.

In addition, the method can comprise:
the separator being a centrifugal separator, setting into rotation of the separator by the rotation of said turbine.

Of course, the separation can also be carried out via:
a static separation par natural gravity segregation of the light phases and of the heavy phases according to their respective density (respectively gas, condensates hydrocarbons, water);
a dynamic separation, for example centrifugal, cyclone or in a propeller of the "Auger" type;
a mechanical activation (motorisation) of said dynamic separation when a mobile element of the dynamic separator is driven by means of a rod, of a shaft or other mechanical transmission devices either by said turbine set into movement by said separated liquid, or by a dedicated hydraulic engine set into movement by said separated liquid, or a dedicated pneumatic engine set into movement by said separated gas.

BRIEF DESCRIPTION OF THE DRAWINGS

Other characteristics and advantages of the invention shall further appear when reading the following description. The latter is purely illustrative, and not limiting, and must be read with regards to the annexed drawings wherein:

FIGS. 1c and 1d show possible alternatives of the embodiment proposed in FIG. 1a;

DETAILED DESCRIPTION OF THE DRAWINGS

Figure 1A:
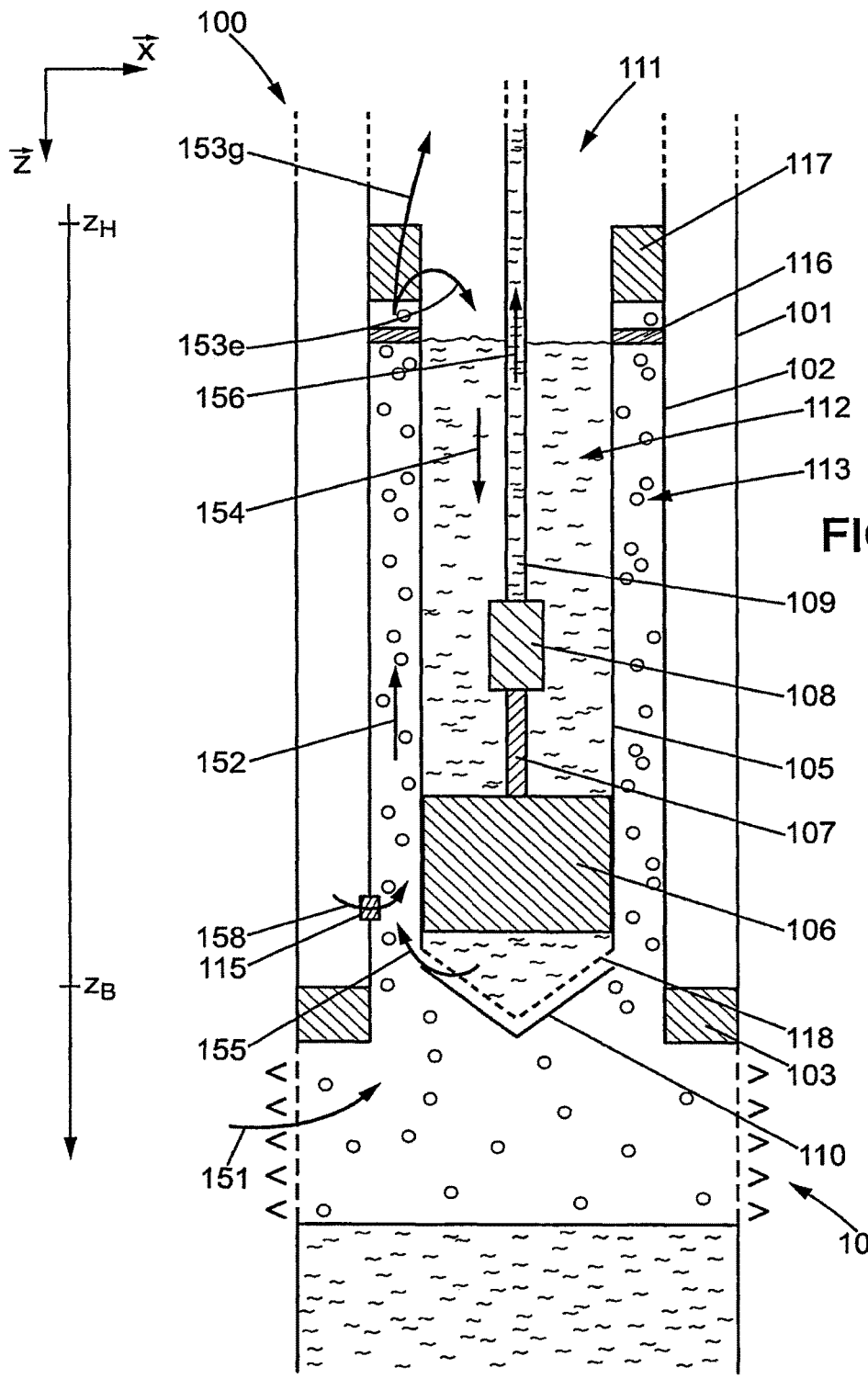
FIG. 1a shows a particular embodiment of the invention wherein the device for eliminating liquid comprises a turbine and a pump.

FIG. 1a shows a particular embodiment of the invention wherein the device for eliminating 100 the liquid comprises a pump 108.

In this embodiment, it is possible to install at the bottom of the well 101 a device for eliminating liquid 100 that makes it possible to substantially improve the economics of the well 101, in particular for its extraction of gas.

Most often, the well 101 comprises a casing making it possible to isolate the well from underground. Inside this casing, is installed a production tube 102 ("tubing") that usually makes it possible to circulate the fluids produced.

In order to prevent the fluids produced from circulating in the annular space between the casing 101 and the tubing 102, a packer 103 is installed above the pay zone 104. This pay zone 104 allows the gases contained underground to be introduced into the well.

In order to implement this particular embodiment of the invention, a tube 105 is introduced into the tubing 102. The bottom of this tube 105 can be located below or above or at the same level as the perforations 104. Of course, it is entirely possible that the bottom of the tube 102 is deeper than the level of the pay zone 104.

The first space mentioned hereinabove comprises the annular space between the tubes 102 and 105. The second space mentioned hereinabove comprises the inside of the tube 105.

The production of gas (arrow 151) on the pay zone 104 (for example, at the foot of the tube 105) induces a mechanism for the rising of the liquid in the annular space formed by the tube 102 and the tube 105 (mechanism referred to as "Gas-Lift" or even more precisely as "auto Gas-lift" if the gas comes from a natural reservoir of pay rock that the well passes through). As such, a mixture formed of gas and of liquid is driven towards the top (arrow 152) of the tube 105. This mixture can mostly be formed of gas (i.e. mixture "with drops") or mostly formed of liquid (i.e. mixture "with bubbles").

The bottom end of the tube 105 is shaped so as to prevent, or at the very least limit, the rising of gas in the tube 105 via the bottom: for example, a deflector 110 can be positioned at the bottom of this tube 105 so as to divert the gas rising in the well (due to the vertical pressure gradient in the well and/or Archimedes' buoyancy in the case of a flow with bubbles) outside the tube 105, between this tube 105 and the tubing 102.

A gas-liquid separator 117 is installed at the top of the tube 105. This separator is a required passage for the mixture rising in the annular space formed by the tube 102 and the tube 105. As such, most often, this separator 117 is installed in the annular space formed by the tube 102 and the tube 105. This separator 117 makes it possible to pour (arrow 153e) the liquid contained in this mixture (at least a substantial portion of the latter) in the tube 105 while the production gas is evacuated (arrow 153g) vertically (in the simplifying assumption wherein the well is a vertical well at this location, a generalisation which is of course possible) at the top of the device in the well. This gas can contain a slight portion of liquid in suspension (droplets or vapour), but in no way commensurate with the initial quantity contained in the mixture, circulating in the annular space, before the separator.

The system can comprise a collector located at the top of the system. This collector is suitable for collecting the run-off liquid on the internal portion of the tube (102) and for conveying it into the second space (112). This configuration allows for a good separation of the run-off liquid flowing downward and of the gases exiting from the separator, and as such prevents an accumulation of liquid above the system, and the loss of energy associated with the re-driving of the run-off liquid by the gas exiting from the separator. This results in a significant improvement in the output of the system.

To this effect, and alternatively, the separator 117 can also make it possible to collect and to direct the downward flow of liquids streaming along the walls of the "tubing" 102 to the inside of the tube 105. These liquids can in particular come from the condensation in the colder and deeper areas of the well of the water vapour associated with the production of the gas of the well.

The tube 105 comprises an opening 118 on its bottom section allowing for a downward circulation of liquid (arrow 155) between the space formed by the inside of the tube 105 and the outside of this tube 105 on deflector 110.

Due to the pressure exerted by the column of liquid contained in the tube 105, this liquid tends to flow downwards in the tube 105 (arrow 154) and to pass through this opening 118 (arrow 155). A continuous circulation of liquid is thus induced. Inside the tube 105, preferentially in its bottom portion, is installed a turbine 106. It is therefore possible to recover a mechanical power on the shaft of the turbine 106 (or on the rod if it is for example a reciprocating piston hydraulic engine) arranged in the downward flowing liquid column and set into movement due to this circulation. The movement of this turbine makes it possible to drive, through an engine shaft (or rod) 107 a pump 108. This pump makes it possible during its operation to pump a portion of the liquid present in the tube 105 and to have it rise to the surface via a riser tube 109.

The flow rate of the liquid in circulation within the tube 105 can be, for example, about 200 m$^3$/d, i.e. a few liters per second, which the flow rate of the pumped liquid is only a few m$^3$/d. The hydraulic load that the turbine is subjected to is limited to a few tens or hundreds of meters of a column of water (with this load being limited by the height of the tube 105 i.e. $z_B$-$z_H$), while the pump may have to pump columns of water (in the riser tube 109) of several thousands of meters.

The turbine is therefore dimensioned so as to process a relatively substantial flow rate of liquid under a low difference in pressures, while the pump, on the contrary, is suitable for generating a large difference in pressures for a low flow rate.

It is then possible (and can be necessary in certain cases), according to the characteristics of the turbine and of the pump, and of the flow rates of the production of gas and of liquid of the well to implement a system for the transmission of hydraulic power provided with an accessory that is somewhat similar to a mechanical speed reducer.

The hydraulic power activating the turbine, produced by a relatively high flow rate by a relatively low difference in pressures, is converted as entirely as possible (to the nearest hydraulic and mechanical outputs of the turbine, of the pump and of the transmission accessories) into a hydraulic power delivered by the pump, produced by a relatively low flow rate by a relatively high difference in pressures.

This reduction in flow rate, is accompanied by an amplification of the pressure generated, stems primarily from the relationship of the "cylinder capacities" (volume of pumping or of turbine for a cycle) of the pump and of the turbine (the "cylinder capacity" of the turbine generally being 50 to 100 times higher than that of the pump).

Such a relationship of cylinder capacities makes it possible to operate the turbine and the pump at an identical operating speed (or rhythm). However, the implementation of a mechanical speed reducer between the turbine and the pump can also be considered so that the operating speed of the pump is less than that of the turbine.

It can be underlined that the system can self-adjust according to the quantity of liquid associated with the production of gas. With stationary flow, the flow rate of gas produced will stabilise for a liquid flow rate in the circulation loop making it possible to activate the turbine at a certain operating speed that in turn makes it possible to activate the pump so that it evacuates the quantity of liquid associated with the flow rate of gas from the well. In other terms, if the flow rate of the pump induced by the speed of the turbine is momentarily more substantial than the flow rate of production liquid separated by the separator, a drop will then follow in the level of liquid in the column in the tube 105 loading the turbine and subsequently a drop in the speed of the turbine, therefore also of the pump, therefore of the flow rate of the liquid pumped and extracted from the well. This process can be amplified until it causes the autonomous stopping of the turbine as long as a sufficient load of liquid is not reconstituted above the turbine in order to put it back in movement.

Injecting production gas at the foot of the device results in a lightening of the mixture contained in the annular space formed by the tube 102 and the tube 105 compared to the weight of the column of liquid in the tube 105. This results in a difference of pressures at the terminals of the turbine that effectively makes it possible to transmit a mechanical power on the shaft 107 that connects the respective driver shafts of the turbine and of the pump.

In light of the particular geometry of wells, the pump and the turbine are preferentially of the progressing cavity type also called the "Moineau" type from the name of their inventor, René Moineau. However, any other type of pump and of turbine could be considered, including reciprocating piston systems (sometimes designated by "HRP" for "Hydraulic Reciprocating Pump") as already exist for other well bottom applications.

In this embodiment, the tubes 102 and 105 are substantially coaxial, which makes it possible to limit the encumbrance of the device. However, they could also be substantially off-axis, or it could quite easily be considered to separate the tube 102 into two using a planar wall extending over the entire diameter of this tube 102 (or on a line parallel to a diameter). This separation into two also makes it possible to reserve a first space for the rising mixture and a second space for the downward flowing liquid.

In addition, a rising of the mixture in the annular peripheral portion and a downward flow of liquid in the central portion is described here. However an opposite configuration can also be considered. In this opposite configuration, it is possible to insert the turbine into the first space.

According to the cases of application:
 the height ($z_B$-$z_H$) of the device 100 is, for example, between 50 m and 250 m, the turbine unit is generally confined over a height between 10 m and 30 m.
 the turbine processes a liquid flow rate between 0.5 l/s and 5 l/s under a difference in driving pressures between 1 bar and 10 bars.
 the pump makes it possible to evacuate, over a height between 500 m and 5000 m, a flow rate between 1 m³/d and 10 m³/d.

The device comprised of the tube 105 and of the turbine-pump unit can be lowered through the production tube 102 by means of a cable. This procedure for implementation is used generally when the well has reached the end of its life, i.e. when the volume of liquids accumulated at the bottom of the well no longer allow it to be eruptive.

The device 100 is not necessarily positioned in the vicinity of the production area 104, but at any position between the production area and the well head. This is particularly notable in the case of a diverted well or more particularly of a horizontal well: it is then preferable to install the equipment above the horizontal portion of the well, in a vertical or pseudo-vertical portion of the well.

If the height of the liquid initially accumulated at the bottom of the well is excessive, the well may no longer be eruptive when the device is implemented.

In this case, it is advantageous to provide a valve 115 positioned deeply in a bottom portion of the well (typically between the production area and the first bottom quarter of the tube 105) in order to inject (arrow 158) compressed gas from the surface into the annular portion formed by the tube 102 and the tube 105. This gas is preferentially a gas similar to the production gas or an inert gas (such as nitrogen) in order to limit the interactions with the production gas.

This injection of gas can also be carried out using an umbilical connecting the surface to this valve 115. This umbilical can be inserted into the annular space between the casing 101 and the tubing 102, but it can also be inserted inside the production tubing 102. Such an umbilical may also have been provided during the initial construction of the well, placed along the outer wall of the casing 101 and which can advantageously open into this case under the "packet" seal 103.

The pressure required for this injection of starting or make-up gas can be very close to the pressure of the reservoir, which here is highly reduced since the well is no longer naturally eruptive. It is in any case much lower than what would be necessary if it entailed doing a "Gas-lift" over the entire depth of the well in such a way as to try to raise the liquids through the tubing 102, which in general cannot be done due to the pressure of the reservoir which has become too low or too expensive in light of the need for power in order to provide the required compressed gas.

This injection makes it possible to activate the operation of the turbine-pump unit (106-107-108) until the height of the liquid accumulated at the bottom of the well is low enough to render the well eruptive again. Then, the injection of gas, coming from the surface, can be interrupted and the circulation of liquid is maintained autonomously due to the flow rate of gas produced by the deposit.

In the starting phase the flow rate of gas injected can be low, in particular due to the load losses in the umbilical of which the length will practically always be greater than 1000 m. In these conditions, the rising two-phase flow is rather of the bubble flow and even gas pocket type.

On the other hand, as soon as the well is sufficiently eruptive, the flow in the rising column rather comprises obstructions or drops and liquid films.

Other starting procedures can be considered in the case where the simple injection of gas through the valve 115 does not make it possible to generate a sufficient difference in pressures at the terminals of the turbine to overcome the torques that resist the starting of the turbine-pump unit.

For example, it is possible to start the device, with or without the supply of gas at the bottom of the well, by temporarily lowering the well head pressure. The production of gas during the temporary lowering phase of the head pressure, makes it possible to activate the turbine-pump unit. As soon as the pump has evacuated a sufficient volume of liquid, the lowering of the head pressure can be interrupted and the well continues to autonomously produce under a higher level of pressure.

In addition, it is possible to implement a starting procedure intended to increase the difference in pressures at the terminals of the turbine, in order to facilitate the starting thereof, without mandatorily lowering the well head pressure.

This procedure can be considered when the production site does not have a gas compression system. In order to carry out this procedure, non-return valves 116 are positioned in a top area of the annular space formed by the tube 102 and the tube 105. These non-return valves allow for a flow of fluid from the annular space formed by the tube 102 and the tube 105 to the top of the well by passion through the separator 117. Of course, this non-return valve is automatically closed if a fluid attempts to flow backwards. This procedure can be summarised as follows:

- Initially the device is filled with liquid. The total height of the liquid is enough for the back pressure induced at the bottom of the well to not allow the deposit to be eruptive.
- Using a pump arranged on the surface, water is injected into the riser tube 109 and a flow is as such imposed in the opposite direction through the pump 108 through the tube 109. This injection of liquid then results in a setting into rotation of the turbine unit in the opposite direction with respect to the normal direction of rotation. The pump then operates in engine/turbine mode.
- The turbine, which then operates in pump mode activated by the pump 108, "sucks" the liquid present in the annular space formed by the tube 102 and the tube 105. The non-return valve 116 then closes and a depressurising of the normally rising annular space is produced. The space depressurised as such is naturally supplemented by:
  - gas injected in a make-up umbilical: the valve 115 is then open (if it exists). In this hypothesis, it must be made sure that the injection pressure is at most equal to the pressure at the bottom of the well so that the gas injected does not open the non-return valve 116.
  - production gas coming from the deposit, in this case the starting procedure does not require a supply of gas coming from the surface.
- At the end of this phase, referred to as the loading of the turbine, the annular space formed by the tube 102 and the tube 105 is filled with gas and the tube 105 is filled with liquid. A substantial hydraulic load is then imposed at the terminals of the turbine.
- During the stopping of the pump installed at the surface and venting to atmospheric pressure (or more generally during the predetermined low pressurisation and proper to the operation) of the end of the tube 109 at the surface, the engine torque supplied by the pump 108 is cancelled and the column of liquid stored in the tube 105 is then discharged through the turbine.
- Once the torques resisting start-up have been overcome (i.e. the static forces of friction i.e. adherence), the gas make-up can make it possible (if necessary) to maintain the circulation of liquid in the system, and therefore the progressive pumping of the liquids accumulated at the bottom of the well until the deposit becomes eruptive again.

In the hypothesis wherein no umbilical or other source of make-up gas is available in order to make it possible to inject a make-up gas via the valve 115 (which then does not exist), it is possible to repeat the loading—unloading cycles of the turbine as described hereinabove until the volume of liquid evacuated to the surface is sufficient to render the well eruptive. It can also be considered to use the tube 109 to inject therein compressed gas from the surface. The advantage with respect to using liquid is that for each injection then decompression cycle carried out in order to put the well back into production, the total inventory of liquids present at the bottom of the well is decreased faster and which are the cause of the loss of natural eruptivity.

The pumping via the line 109 is not necessarily carried out up to the surface. It is also possible to pump the liquid to an area underground suitable for accumulating liquid. This zone can be an old reservoir or an unused well located above or below the area 104 currently in operation.

The circulation loop provided with a hydraulic turbine as such makes it possible to convert in particular the expansion power of the gas and/or the evacuation power of the gases of the completion. This solution is more particularly suited to an application at the bottom of the well, where the encumbrance constraints and the presence of liquids in particular makes it practically impossible to use a gas turbine to directly expand the gas and activate the pump that provides the evacuation of the liquids.

Figure 1B:
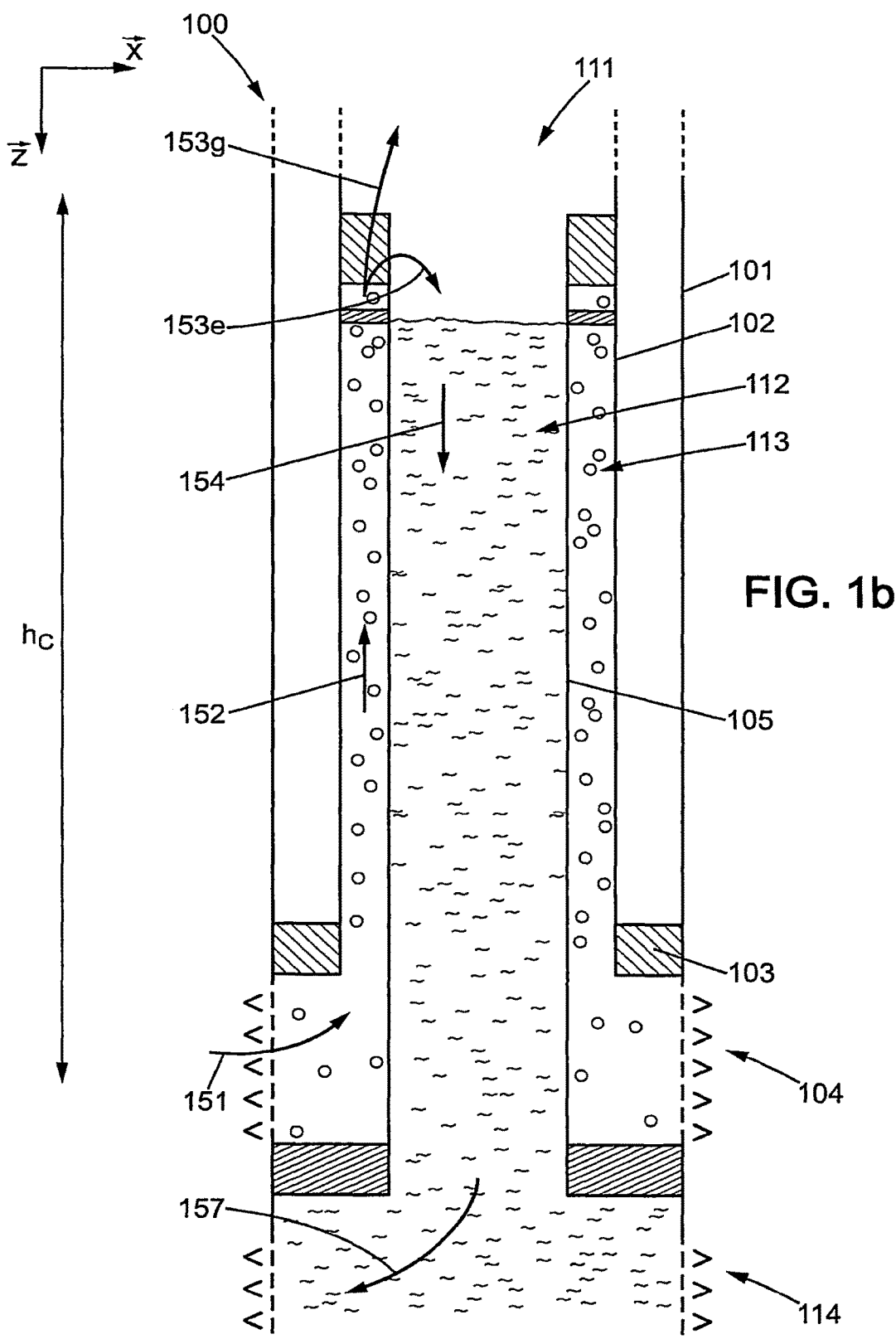
FIG. 1b shows a particular embodiment of the invention wherein the device for eliminating liquid comprises a former geological reservoir of which the production is completed or a reservoir of which the production is not, at least for the moment, desired via said well.

FIG. 1b shows a particular embodiment of the invention wherein the device for eliminating liquid comprises an old reservoir of which the production is completed.

Indeed, using a turbine is not the only solution that makes it possible to make use of the gravitational potential energy of the liquid present in the tube 105 in order to eliminate this liquid from the well.

If there is, under the reservoir currently in operation another different reservoir and disconnected from the level currently in production, it may be possible to use it in order to inject the liquid contained in the tube 105. This reservoir can have a reinjection pressure that is lower than the maximum hydrostatic pressure of the column of liquid contained in the tube 105 (for example less than or equal to about 15 bars in the case of a device with 150 m in height $h_c$).

Reinjection is then possible thanks to the generation of a simple hydraulic load (i.e. use of the gravitational potential energy of the liquid present in the tube 105) without implementing any hydraulic power component.

Any other application that requires a source of energy at the bottom of the well that can be supplied by this gravitational potential energy or hydraulic load is possible.

The turbine-pump unit described hereinabove can also be used to reinject the liquids into the lower reservoir if the hydraulic load available in the descending column is not high enough. In this case, the pump 108 of FIG. 1a can be located under the turbine 106. The discharge of the pump by the tube 109 is carried out in the direction of the bottom of the well rather than towards the surface.

Figure 1C:
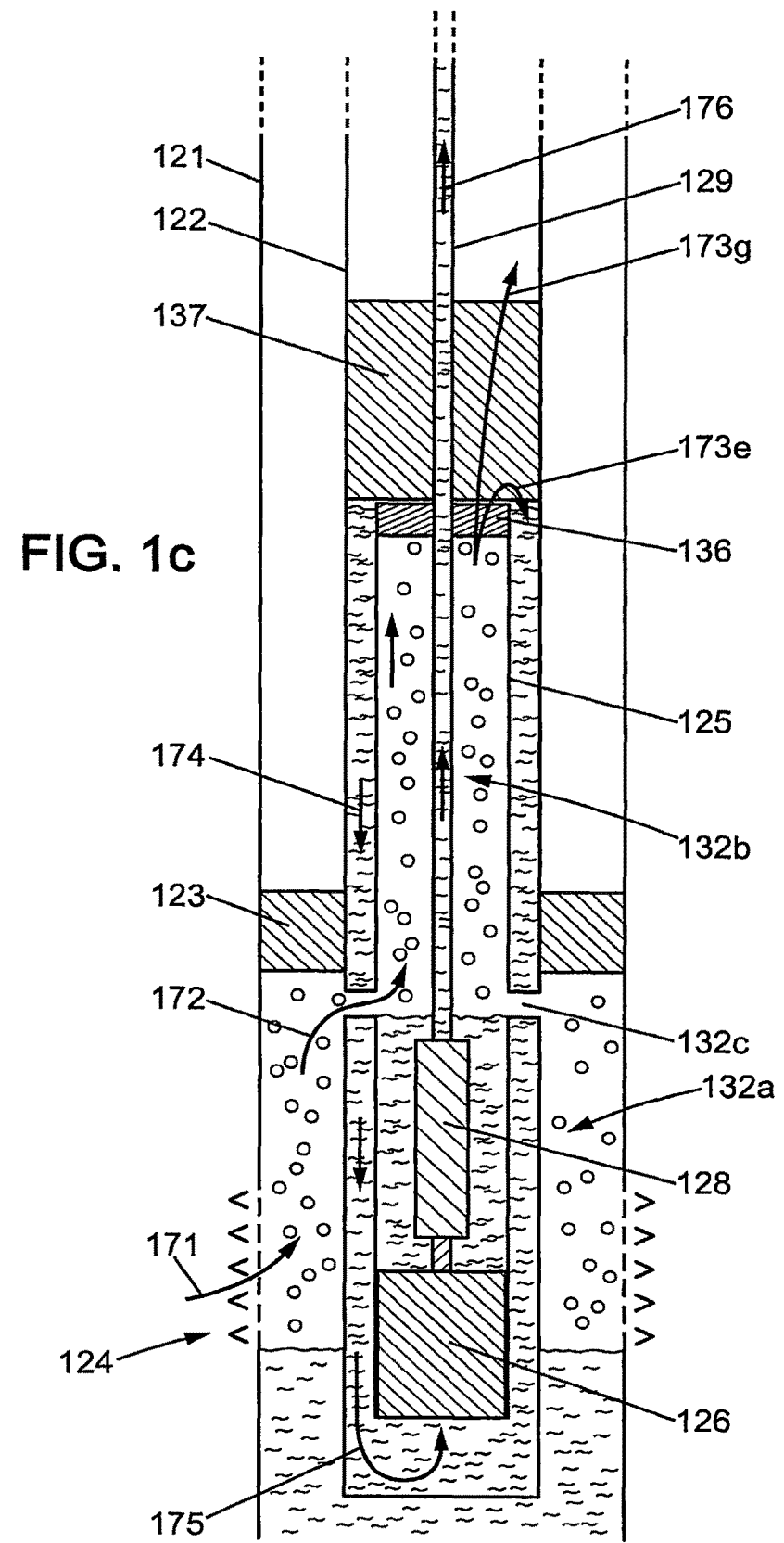

FIG. 1c shows a possible alternative of the embodiment of FIG. 1a.

In this embodiment, the well comprises in the same way a casing 121. Inside this casing, is installed a production tube 122 (or "tubing").

In order to prevent the fluids produced from circulating in the annular space between the casing 121 and the tubing 122, a packer 123 is installed above the pay zone 124. The "reservoir-wellbore interface" 124, carried out for example by means of perforations of the wall of the casing 121, allows the fluids contained in the pay reservoir underground to be introduced into the well.

The bottom end of this tubing 122 is sealingly closed so as to limit any flow of fluid at this level.

A tube 125 is introduced into the tubing 122.

In addition, tubes 132c are installed on the device in order to connect corresponding openings carried out on the tubes 122 and 125. These tubes as such allow for a flow of fluids from the space 132a to the space 132b, without allowing a direct flow of fluids from the space 132a to the annular space between the tubes 122 and 125. There can be one or several tubes 132c on the device. Of course, the flow of liquid in the annular space formed between the tubes 122 and 125 remains possible, by circumventing these tubes 132c.

The first space mentioned hereinabove comprises the space 132*a*, 132*b* and 132*c*. The second space mentioned hereinabove comprises the annular space formed between the tubes 122 and 125.

The production of the gas (arrow 171) at the level of pay zone 104 induces a rising of liquid in the space 132*a* then in the space 132*c* (arrow 172), then finally in the space 132*b*.

A gas-liquid separator 137 is installed at the top of the tube 125. This separator is a required passage for the mixture rising from the space 132*b*. This separator can be a static separator or advantageously a dynamic separator, for example centrifugal. Where applicable, the separator can be an activated separator. It can for example be a centrifugal separator set into rotation by the vertical movement of the mixture or by the flow rate of separated gas or by the flow rate of separated liquid or it can also be set into rotation by an external system (electric motor, external mechanical torque, etc.). This centrifugal separator can have for effect to flush the liquid (arrows 173*e*) via centrifugation against the walls of the tube 122, liquid which will then flow in the annular space formed by the tubes 122 and 125. As such, the fact that the second space is located at the periphery of the first space can be advantageous in order to collect the centrifuged liquid simply.

Non-return valves 136 can be positioned in a top area of the annular space formed by the tube 122 and the tube 125. These non-return valves allow for a flow of fluid of the annular space formed by the tube 122 and the tube 125 upwards from the well passing through the separator 137. Of course, these non-return valves are automatically closed if a fluid attempts to flow backwards.

The production gas is evacuated (arrow 173*g*) to the top of the device in the well.

Due to the pressure exerted by the column of liquid contained in the annular space formed by the tubes 122 and 125, this liquid tends to flow downwards in this annular space (arrow 174) and to circulate towards the inside of the tube 125 (arrow 175) thanks to the opening of this tube 125 in its bottom portion.

Inside the tube 125, preferentially in its bottom portion, is installed a turbine 126. In addition, due to the arrival of the liquid on the turbine by its lower end, the axial thrust applied by the liquid on the turbine tends to offset the axial thrust applied by the liquid on the pump.

It is then possible to recover a mechanical power on the shaft of the turbine 126 set into movement due to this circulation. The movement of this turbine makes it possible to drive, through an engine shaft or a rod a pump 128. This pump makes it possible during its operation to pump a fraction of the liquid present on this pump and to cause it to rise to the surface via a riser tube 129 in a manner similar to what is presented in the other embodiments.

The liquid rising in the tube 125 could tend to penetrate into the tubes 132*c* during its rising. However, the speeds of the flow of fluids circulating from the space 132*a* to the space 132*b* are such that this liquid is "blown" and carried off in the mixture to the top of the tube 125.

It is also possible to provide a system of injecting gas as proposed in relation with FIG. 1*a*.

The pump and the turbine are preferentially of the progressing cavity type. However, pumps and turbines of any other type can be used, including reciprocating piston systems as already exist for other well bottom applications.

Figure 1D:
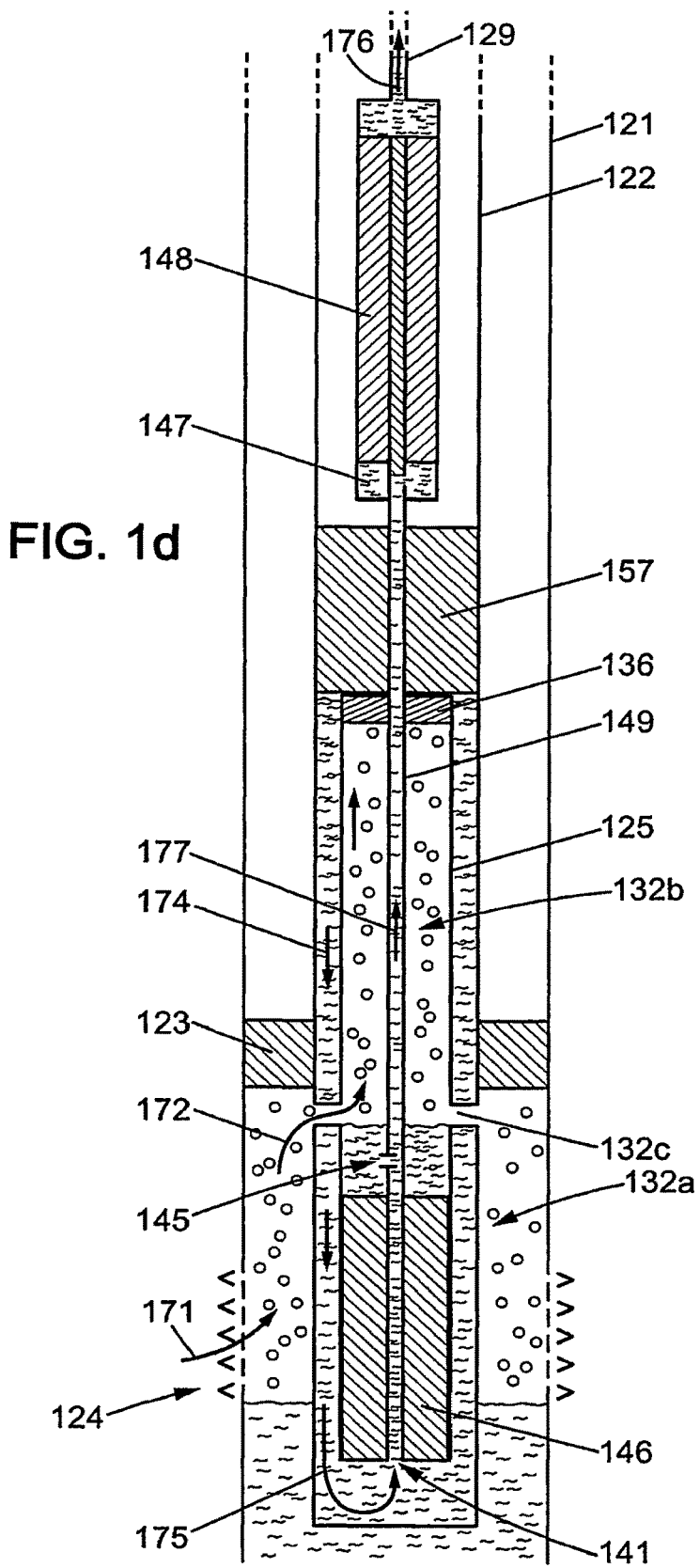

FIG. 1*d* shows a possible alternative of the embodiment of FIG. 1*a* or of FIG. 1*c*.

In this embodiment, the pump 148 is located above the separator 157 and the turbine 146. As such, this embodiment makes it possible to avoid positioning the pump within the second space and to facilitate the setting up of the device for eliminating liquid.

In addition, if the pump 148 has a problem (possible due to the fact that this pump is subjected to a substantial difference in pressure), it can be easier to access it first to replace it without having to raise the entire system described.

In order to activate the pump, it is possible to provide an engine shaft 149 that connects the turbine to the engine, with this engine shaft being hollow in order to allow a liquid fluid to circulate therein. As such, the pump driven by the turbine creates a downstream vacuum of the turbine, with a liquid therefore being driven in the tube 149 upwards.

The pumping tube 129 above the pump 148 (and evacuating the liquid to the surface (arrow 176) or to another reservoir) is not necessarily in rotation during the pumping: only the tube 149 is in rotation in order to transmit the engine torque.

It is also possible to take advantage of the engine shaft 149 to confer a rotational movement on the centrifugal separator 157.

The volume 147 located under the pump 148 makes it possible to transfer the sucked liquids in the hollow rod 149 to the suction of the pump 148. This transfer is carried out thanks to holes made in the rod 149. The volume 147 provides the seal between the body of the pump 148, the hollow rod 149 in rotation and the annular space between the pump 148 and the tube 122.

The alimentation of the volume 147 (arrow 177) can be carried out from the drawing-off point 145 (located between the discharge of the turbine and the space 132*c*) via the hollow rod 149 and holes made in this rod. A drawing-off point can also, as a supplement or alternatively, be located at the very bottom of the hollow rod (point 141).

Although it is not shown in FIG. 1*d*, this version of the system can be improved further by a collector of liquid located above the pump 148. This collector would let the gas production be evacuated at the top of the device in the well, but would collect the streaming liquid along the walls of the tube 122. This liquid would flow through an ad-hoc pipe located in the space between the pump 148 and the tube 122, up to volume 147. The liquid would then be able to be pumped by the pump 148.

Figure 2:
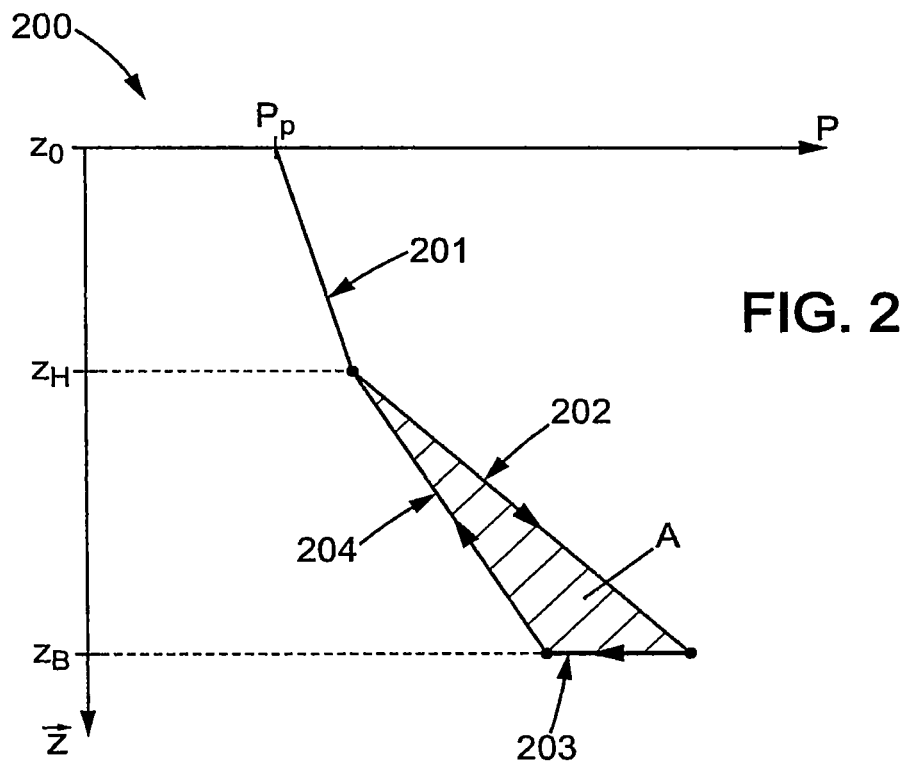
FIG. 2 shows a pressure curve in the well in an embodiment according to the invention.

FIG. 2 shows a pressure curve in the well in the embodiment described with respect to FIG. 1*a*.

The pressure $P_p$ is the pressure of the gas at the well head (mark $z_0$). The curve 201 shows a slight increase in the pressure during the descent in the well, the slope primarily corresponds to the hydrostatic pressure gradient of the gas flowing in the well (with possibly a few droplets of liquid driven by this gas).

At mark $z_H$, is the beginning of the device for eliminating liquid such as described hereinabove (i.e. the top of the tube 105 of FIG. 1*a*). The curve 202 describes the pressure within the tube 105 filled with liquid: the slope of this curve primarily corresponds to the hydrostatic pressure gradient and to the gradient of load losses via friction within this tube 105. The curve 204 describes the pressure within the annular space formed by the tube 102 and the tube 105: as this space is filled with a liquid-gas mixture, the slope of this curve primarily corresponds to the hydrostatic pressure gradient and to the gradient of the load losses by friction of this mixture. Of course the slope of this curve 204 (variation in pressure over the variation in height) is lower than the slope of the curve 202, as the density of the mixture is lower than the density of the "pure" liquid (i.e. without gas).

The point of mark $z_B$ corresponds to a point at the bottom of the tube 105.

The curve 203 represents the difference in pressure available at the terminals of the turbine, which would in this case be positioned at the foot of the device, or available for a reinjection of the liquids into a depleted reservoir.

The curves 204, 202 and 203 form a cycle and follow the circulation described hereinabove, in the particular case where the device is provided with a turbine. By analogy with an engine cycle, it is possible to visualise the fact that the circulation described hereinabove produces a work W (substantially proportional to the area A of the triangle of which the edges are 202, 203 and 204, the surfaces of the sections of the annular space and of the tube able to come into consideration), with the latter being maximal if the mixture rising in the annular space formed by the tube 102 and the tube 105 is poor in liquid and if the fluid flowing downwards in the tube 105 is poor in gas, i.e. if the pressure differential between the annular space and the inside of the tube is large.

The work produced by such a device can be slightly less than this theoretical work, as energy dissipations internal to the fluid transported can occur.

In any case, it is also possible to observe that the pressure at the terminals of the turbine allow for the setting into movement of the latter.

Figure 3:
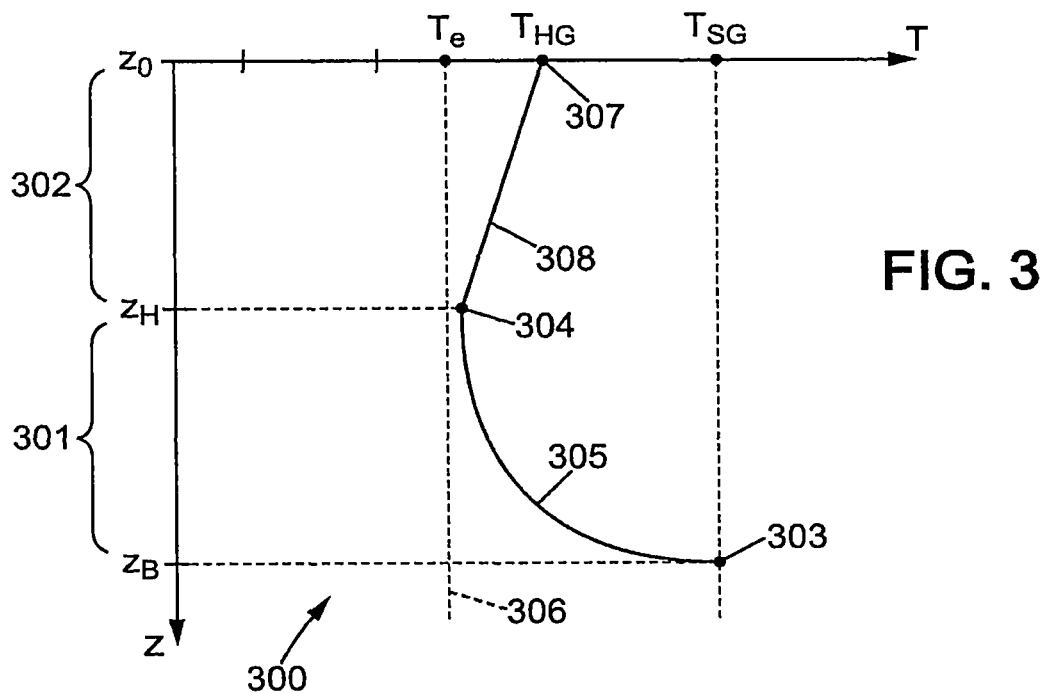
FIG. 3 shows a temperature curve in the well in an embodiment according to the invention.

FIG. 3 shows a temperature curve in the well in an embodiment according to the invention.

The method described in FIG. 1a can be assimilated to an expansion process of a gas through a gas turbine. In the case of FIG. 1a, the expansion power of the gas is first of all transmitted to the liquid, which rises in the first space, then is used by the turbine of which the shaft delivers a mechanical power.

The application of the principle of energy conservation to such a thermodynamic transformation shows that this expansion is accompanied by a drop in the temperature of the gas. In the case of a perfect gas, the relationship of the temperatures at the terminals of a gas turbine would be such that:

$$\frac{T_2}{T_1} = \frac{p_2}{p_1}^{\frac{\gamma-1}{\gamma}}$$

wherein γ is the isentropic exponent of the gas and $$\frac{p_2}{p_1}$$

is the rate of expansion of the gas, i.e. relationship of the pressures at the terminals of the turbine.

It is possible to observe that the method described makes it possible to cool the gas produced.

In certain particular cases, this cooling could be accompanied by a partial condensation of the vapour conveyed by the gas. Forcing a drying of the gas, via condensation, at the bottom of the well, would then make it possible to limit the appearance of condensates along the well, and the penalisation of the productivity of the well that results from this (as the presence of liquid condensates along the well substantially increases the pressure to be overcome by the gas at the bottom of the well in order to flow naturally to the surface).

During its rising in the annular space formed by the tube 102 and the tube 105, the gas expands due to the pressure gradient primarily imposed by the presence of the liquid. The expansion work of the gas is then partially transmitted to the liquid.

As the transfers of heat are relatively effective between the liquid and the gas in the annular space and as the thermal capacity of the liquid flow is large with respect to that of the gas, the liquid imposes, in established regime, its temperature to the gas substantially over their entire height of the annular space.

It is then observed that the volume of liquid circulating in the loop converges towards a balanced thermodynamic situation wherein its temperature $T_e$ is stabilised at a value less than the temperature of the gas produced $T_{SG}$ by the deposit.

As such, if the temperature of the gas is $T_{SG}$ at the level of its extraction (mark $z_B$), its temperature decreases quickly (curve 305) in the area 301 (i.e. the area corresponding to the annular space between the marks $z_B$ and $z_H$) to converge towards the equilibrium temperature of the water $T_e$. At point 304, i.e. at the output of the annular space, the gas therefore penetrates into the well (outside of the device 100) at a temperature close to $T_e$.

In the area 301, the transfers of heat with the surrounding terrain, which would tend to heat the liquid, can advantageously be limited (for example via a thermal insulation of the well between the casing and the tubing) or between the casing and the layer of natural land.

During its rising in the well (zone 302 included the mark $z_H$ and the mark $z_0$), the gas is heated progressively due to the thermal exchanges with the underground to the well head (point 307).

Of course, this invention is not limited to the embodiments described hereinabove as examples; it extends to other alternatives.

Other embodiments are possible.

For example, the well and the various tubes are described as being circular sections, but other sections such as oval sections are possible.

The invention claimed is:

1. A system for extracting liquid from a well producing liquid and/or gas, wherein the system comprises:
    a separation wall defining in a portion of said well at least one first space and a second space,
    a liquid-gas separator,
    a pump,
    a hydraulic turbine;
    and wherein,
    the first space is suitable for conveying a mixture comprising said gas and said liquid from a production area to said separator,
    the separator is suitable for separating said gas and said liquid from said mixture during a circulation of said mixture from the first space,
    the second space is suitable for receiving the liquid separated from said mixture, the second space comprises a bottom opening in a first bottom area of said well, the bottom opening being suitable for allowing a circulation of the separated liquid from the second space to the first space;
    the turbine is suitable for being set into movement under the effect of a circulation by gravity of the separated liquid; and
    the pump is suitable for being driven by the movement of said turbine and is suitable for eliminating a quantity of separated liquid by pumping.

2. The system according to claim 1, wherein a flow rate of the quantity of eliminated liquid is less than a flow rate that puts said turbine into movement.

3. The system according to claim 1, wherein the system further comprises a collector located at a top of the system and suitable for collecting a liquid streaming on an internal portion of a tube and in conveying it into the second space.

4. The system according to claim 1, wherein the system further comprises an injection orifice able to allow for an injection of gas into a second bottom area of the first space.

5. The system according to claim 1, wherein the system further comprises an anti-backflow device allowing for the circulation of the mixture from the first space to the second space through the liquid-gas separator.

6. The system according to claim 1, wherein the separator is a centrifugal separator or a cyclone separator or a vortex separator or an Auger separator.

7. The system according to claim 6, wherein the separator is driven in rotation by the movement of the turbine or by the movement of an auxiliary engine.

8. The system according to claim 6, wherein the turbine and the pump are connected by a hollow shaft suitable for transmitting a mechanical power from the turbine to the pump and for pumping a liquid from the second space.

9. The system according to claim 1, wherein the second space is located around the first space.

10. The system according to claim 1, wherein the separator is located between the turbine and the pump.

11. The system according to claim 1, wherein said separation wall comprises a secondary tube inserted into a main tube, with the first space comprising a space between the main tube and the secondary tube, with the second space comprising a space in the secondary tube.

12. The system according to claim 1, wherein the well is thermally insulated in the portion of the well wherein the first space and the second space are defined.

13. The system according to claim 1, wherein the thermal exchanges between the well and the outside of the well are favoured in a portion of the well above the first space and the second space.

14. A method for extracting gas from an extraction well producing gas and/or liquid, with the well comprising a separation wall defining in a portion of said well a first space and a second space, a hydraulic turbine and a pump, the second space comprising a bottom opening allowing for a communication between the second space and the first space in a first bottom area of said well, wherein the method comprises:
conveying in the first space a mixture comprising said gas and said liquid from a production area to a liquid-gas separator;
separating said liquid and said gas within said liquid-gas separator;
conveying said separated gas in the well from the separator to a well output area;
introducing said separated liquid into the second space;
setting into movement the turbine under the effect of a circulation by gravity of the separated liquid;
pumping of a quantity of the separated liquid, said pumping being activated by the putting into movement of said turbine.

15. The method according to claim 14, wherein the method further comprises:
injection of gas into a second bottom area of the first space.

16. The method according to claim 14, wherein the second space comprising a bottom opening communicating with a third space suitable for receiving said quantity of separated liquid, with the third space being located under the second space, with the third space being isolated from the first space, the method further comprises:
conveying said quantity of separated liquid in the third space through the bottom opening.

17. The method according to claim 14, wherein the method further comprises:
the separator being a centrifugal separator, setting into rotation of the separator by the rotation of said turbine.

* * * * *